US008080976B2

(12) United States Patent
Manor et al.

(10) Patent No.: US 8,080,976 B2
(45) Date of Patent: Dec. 20, 2011

(54) CHARGING METHODS FOR BATTERY POWERED DEVICES

(75) Inventors: Dror Manor, Herzlia (IL); Amnon Saar, Tel Aviv (IL); Guy Weinstein, Neve Monosson (IL)

(73) Assignee: Techtium Ltd., Tel-Aviv (IS)

( * ) Notice: Subject to any disclaimer, the term of this patent is extended or adjusted under 35 U.S.C. 154(b) by 405 days.

(21) Appl. No.: 12/518,642

(22) PCT Filed: Dec. 11, 2007

(86) PCT No.: PCT/IL2007/001532
§ 371 (c)(1),
(2), (4) Date: Jun. 11, 2009

(87) PCT Pub. No.: WO2008/072232
PCT Pub. Date: Jun. 19, 2008

(65) Prior Publication Data
US 2010/0013430 A1    Jan. 21, 2010

Related U.S. Application Data

(60) Provisional application No. 60/873,947, filed on Dec. 11, 2006.

(51) Int. Cl.
*H01M 10/44*    (2006.01)
(52) U.S. Cl. .................... 320/118; 320/132
(58) Field of Classification Search .................. 320/106, 320/107, 118, 119, 132, 149; 324/426, 433, 324/434
See application file for complete search history.

(56) References Cited

U.S. PATENT DOCUMENTS

| | | | |
|---|---|---|---|
| 5,164,652 A | 11/1992 | Johnson et al. | |
| 5,237,257 A | 8/1993 | Johnson et al. | |
| 5,406,266 A | 4/1995 | Mino et al. | |
| 5,686,815 A | 11/1997 | Reipur et al. | |
| 5,850,134 A | 12/1998 | Oh et al. | |
| 6,124,698 A | 9/2000 | Sakakibara | |
| 6,400,123 B1 | 6/2002 | Bean et al. | |
| 6,404,164 B1 | 6/2002 | Bean et al. | |
| 6,504,344 B1 | 1/2003 | Adams et al. | |
| 6,683,440 B2 | 1/2004 | Kawakami et al. | |
| 7,259,538 B2 | 8/2007 | Melton et al. | |
| 7,646,169 B2 * | 1/2010 | Liu et al. | 320/127 |
| 2004/0145371 A1 | 7/2004 | Bertness et al. | |

FOREIGN PATENT DOCUMENTS
WO    WO 2008/072232 A3    5/2009
* cited by examiner

*Primary Examiner* — Edward Tso
(74) *Attorney, Agent, or Firm* — Daniel Feigelson

(57) ABSTRACT

A battery charge control system including an algorithm for determining whether the battery chemistry of a battery pack for use in a portable electronic device is primary, in which case charging is prevented, or secondary, in which case charging is enabled. The routine operates by measuring the terminal voltage and temperature of the battery under certain predetermined tests, which generally include a combination of voltage and internal impedance tests performed during charge or discharge. Additionally, a method is described to detect and to correct for lack of cell balance within the rechargeable battery pack of a portable electronic device. A cell or cells of the battery pack which are close to depletion, or are completely depleted, are detected, and a discharge/charge routine is executed to provide for optimum recharging of all of the cells of the battery, thus ensuring proper cell balance, and most efficient power usage.

23 Claims, 4 Drawing Sheets

(CONT. OF FIG 2B)

CHARGING METHODS FOR BATTERY POWERED DEVICES

This is a 35 U.S.C. §371 application of PCT/IL2007/001532, filed Dec. 11, 2007, and claims the benefit under 35 U.S.C. §120 of said PCT application, and further claims the benefit under 35 U.S.C. §119(e) of U.S. Provisional Patent Application Ser. No. 60/873,947, filed Dec. 11, 2006. The contents of these priority applications are incorporated herein by reference.

FIELD OF THE INVENTION

Background of the Invention

In any portable electronic device in which replaceable cells are used, and in which it is possible to recharge the cells, it is important to establish the battery chemistry of the cells installed by the user, in order to avoid the danger of attempting to charge primary cells. Many methods exist in the prior art for determining the chemistry of such cells, such as in U.S. Pat. No. 6,404,164 for "Method of Battery Chemistry Identification through Analysis of Voltage Behavior" to H. N. Bean et al., which utilizes a method of applying a moderate load to the battery and monitoring the dynamic voltage change on application and/or on removal of the load. This method is applied in U.S. Pat. No. 6,400,123, for "Battery Fuel Gauging using Battery Chemistry Identification" also to H. N. Bean et al. In U.S. Pat. No. 7,259,538, to G. Melton et al., there is described a method of adaptive battery conditioning employing battery chemistry determination. However, such prior art methods generally assume that the battery being tested is in good condition and in a good state of charge, and is already in use in the device, and determination of the battery chemistry is usually based on these assumptions. In real life situations, batteries may be used which are in various states of viability, ranging from new batteries having a full capacity, down to old batteries which can hold very little charge, or are completely dead, even if of a rechargeable type. Many of the prior art methods do not address such situations, and there therefore exists the need for a method of determining battery chemistry, in order to determine its suitability for charging, taking into account the general condition of the battery being tested.

Furthermore, when the rechargeable battery of a portable electronic device contains more than one cell, it is important to ensure that all of the cells have a similar level of depletion, and that none of them are in a much more depleted state than the others before commencing to charge the cells, since the flow of a full charging current through a fully charged cell, known as overcharging, will reduce its lifetime, and is energetically wasteful. There therefore exists a need for a cell balancing procedure which can be applied by the charge control systems of such portable electronic devices.

The disclosures of each of the publications mentioned in this section and in other sections of the specification, are hereby incorporated by reference, each in its entirety.

BRIEF SUMMARY OF THE INVENTION

The present invention seeks to provide, according to a preferred embodiment of the present invention, a new method of determining the chemistry of a battery, and in particular, whether a battery is primary or secondary, such that it can be determined whether the battery can be safely charged or not. It also provides an indication of the condition of the battery, either regarding its capacity or regarding its state of charge.

The method operates by means of a combination of terminal voltage measurements before, during and after various charge routines, including both low level and moderate level currents. The method utilizes either charging or discharging of the battery, and the terminal voltages measured are compared to predetermined values known from the expected behavior of cells, whether primary or secondary and whether in good or poor condition. Impedance determination of the battery is an important feature of the methods of the present invention. The impedance determination is generally performed by flowing a current through the battery, and either by dividing the value of voltage increase by the current flow through the battery, or by any other function of the voltage response of the battery to the current flow through it.

The invention also seeks to provide, according to another preferred embodiment of the present invention, a new method to detect and to correct for lack of cell balance within the rechargeable battery pack of a portable electronic device. A cell or cells which are close to or completely depleted, is detected, and a discharge/charge routine is executed to provide for optimum recharging of all of the cells of the battery, thus ensuring proper cell balance, and most efficient power usage.

There is thus provided in accordance with a preferred embodiment of the present invention, a method of determining the nature of an electro-chemical battery, comprising the steps of:

(a) measuring the initial voltage of the battery, (b) according to the initial voltage, determining the initial impedance of the battery by generating a current flow through the battery, and measuring the voltage change of the battery as a result of the current flow, (c) according to the initial impedance, performing the steps of:

(i) applying a pre-charge current, and measuring the voltage of the battery at intervals during the application of pre-charge current, and (ii) according to the voltage of the battery during the application of pre-charge current, making at least one internal impedance determination of the battery by generating at least one increased current flow through the battery, and measuring the voltage change of the battery as a result of the at least one increased current flow, and (d) utilizing at least one of the initial measured voltage, the measured voltage of the battery during the application of pre-charge current, the initial impedance, and the internal impedance to determine the nature of the electro-chemical battery.

In accordance with still another preferred embodiment of the present invention, in the above-described method, if the initial voltage is above a first predetermined voltage, the battery is considered to be a primary battery, and if the initial voltage is below a second predetermined voltage, the battery is considered to be unusable. Additionally, if the initial impedance is above a first predetermined impedance, the battery is considered to be a primary battery, and if the initial impedance is below a second predetermined impedance, the battery is considered to be a secondary battery. Furthermore, the pre-charge current is preferably applied if the initial impedance falls between the first predetermined impedance and the second predetermined impedance. In accordance with a further preferred embodiment of the present invention, in the above described methods, if the voltage measured during the pre-charge application rises above the first predetermined voltage, the battery is considered to be a primary battery, and if, at the end of the predetermined time, the voltage measured during the pre-charge application has not risen above a third predetermined voltage between the second and first predetermined voltages, the battery is considered to be unusable.

There is even further provided in accordance with another preferred embodiment of the present invention, a method as described above, and wherein the internal impedance is measured at intervals during the pre-charge application, and if at least one of the internal impedance determinations is found to be above a first predetermined impedance, the battery is considered to be a primary battery, and if at least one of the internal impedance determinations is found to be below a second predetermined impedance, the battery is considered to be a secondary battery.

There is also provided in accordance with a further preferred embodiment of the present invention, a method as described above, and wherein the internal impedance is measured after the application of pre-charge current, and if the internal impedance is found to be above the second predetermined impedance, charging of the battery is prevented, and if the internal impedance is found to be below the second predetermined impedance, the battery is considered to be a secondary battery.

In any of the above-described methods, the at least one internal impedance determination may preferably comprise any one of a single point impedance measurement, an averaged impedance measurement over one application of at least one increased current flow, the final impedance measurement after one application of at least one increased current flow, and a combination of impedance measurements from a plurality of increased current flows. Furthermore, the increased current flow may preferably be generated either by applying a charge current to the battery, or by discharging a current from the battery. The at least one increased current flow through the battery may preferably be an incrementally increasing current flow, in which case it preferably continues until either one of a predetermined battery voltage and a predetermined charge current is reached.

Additionally and preferably, the pre-charge current may be a predetermined fraction of the recommended charge current of the battery.

In any of the above described methods, if the battery is determined to be any one of a primary battery, an unusable battery, or a full rechargeable battery, charging of the battery is prevented, while if it is determined to be a secondary battery, charging of the battery is enabled.

There is even further provided in accordance with another preferred embodiment of the present invention, an alternative method of determining the nature of an electrochemical cell, comprising the steps of:
(a) measuring the initial voltage of the cell while the cell is passing no current,
(b) according to the initial voltage, measuring the initial internal impedance of the cell,
(c) according to the initial internal impedance, performing the steps of:
(i) applying a pre-charge current of a predetermined fraction of the recommended charge current of the cell, and periodically measuring the voltage of the cell, and
(ii) according to the voltage of the cell during the pre-charge step, making at least one internal impedance measurement of the cell by generating an incrementally increasing current flow in the cell, and measuring the voltage of the cell during at least one incrementally increasing current flow, and
(d) utilizing at least one of the measured voltages and the internal impedances to determine the nature of the electrochemical cell.

There is further provided in accordance with yet another preferred embodiment of the present invention a method of determining the nature of an electrochemical battery, comprising the steps of:
(a) measuring the initial voltage of the battery,
(b) according to the initial voltage, performing one of the steps of:
(i) applying a pre-charge current of a predetermined fraction of the recommended charge current of the battery for a predetermined time, and measuring the voltage of the battery during the predetermined time, and
(ii) generating an incrementally increasing current flow in the battery, and measuring the voltage of the battery during the application of the incrementally increasing current flow, and
(c) utilizing at least one of the measured voltages to determine the nature of the electrochemical battery.

According to this method, if the initial voltage is above a first predetermined voltage the battery is considered to be a primary battery, and if the initial voltage is below a second predetermined voltage, the battery is considered to be unusable. Additionally, the precharge current step is preferably applied if the initial voltage falls between the first predetermined voltage and a third predetermined voltage less than the second predetermined voltage. If, during the precharge step, the voltage does not rise above a fourth predetermined value, the battery is then considered to be unusable.

In accordance with still another preferred embodiment of the present invention, in this method, the incrementally increasing current flow is applied if the initial voltage falls between the third predetermined voltage and the second predetermined voltage. If the voltage measured during the incrementally increasing current flow rises above a fifth predetermined voltage, greater than the first predetermined voltage, the battery is then considered to be unusable.

There is further provided in accordance with still another preferred embodiment of the present invention, a method as described above, and wherein the voltage measured during the incrementally increasing current flow is utilized to determine the internal impedance of the battery, and if the internal impedance is greater than a predetermined level, the battery is considered to be unusable, while if the internal impedance is less than the predetermined level, the battery is considered to be a secondary battery fit for charging.

In any of the above described methods, the incrementally increasing current flow may preferably be generated by applying an incrementally increasing charge current to the battery, or by discharging an incrementally increasing charge current from the battery.

Finally, in accordance with yet another preferred embodiment of the present invention, there is provided a method of ensuring cell charge balance in a rechargeable battery comprising a plurality of cells, comprising the steps of:
(a) determining the state of charge of each cell of the battery,
(b) locating at least one deficient cell, the deficiency of the cell being in that its state of charge is significantly less than that of at least one other cell,
(c) discharging all of the cells located from the at least one deficient cell towards one end of the battery, and
(d) recharging the at least one deficient cell together with all of the cells located from the at least one deficient cell towards the one end of the battery.

Although in strict use of the terminology, the term "battery" defines an assembly of more than one cell, in popular current usage, the term battery is also used almost universally to describe a single cell. This usage is therefore generally adopted in those of the embodiments of this application relating to battery chemistry determination, and the term battery is also thuswise claimed. The various described methods of the embodiments of the present invention are thus understood to be applicable both to individual cells, or to batteries comprising more than one cell, and no limitation to the invention has been implied in these embodiments, or as claimed, by use of the popular nomenclature "battery".

BRIEF DESCRIPTION OF THE DRAWINGS

The present invention will be understood and appreciated more fully from the following detailed description, taken in conjunction with the drawings in which.

DETAILED DESCRIPTION OF THE INVENTION

Figure 1:
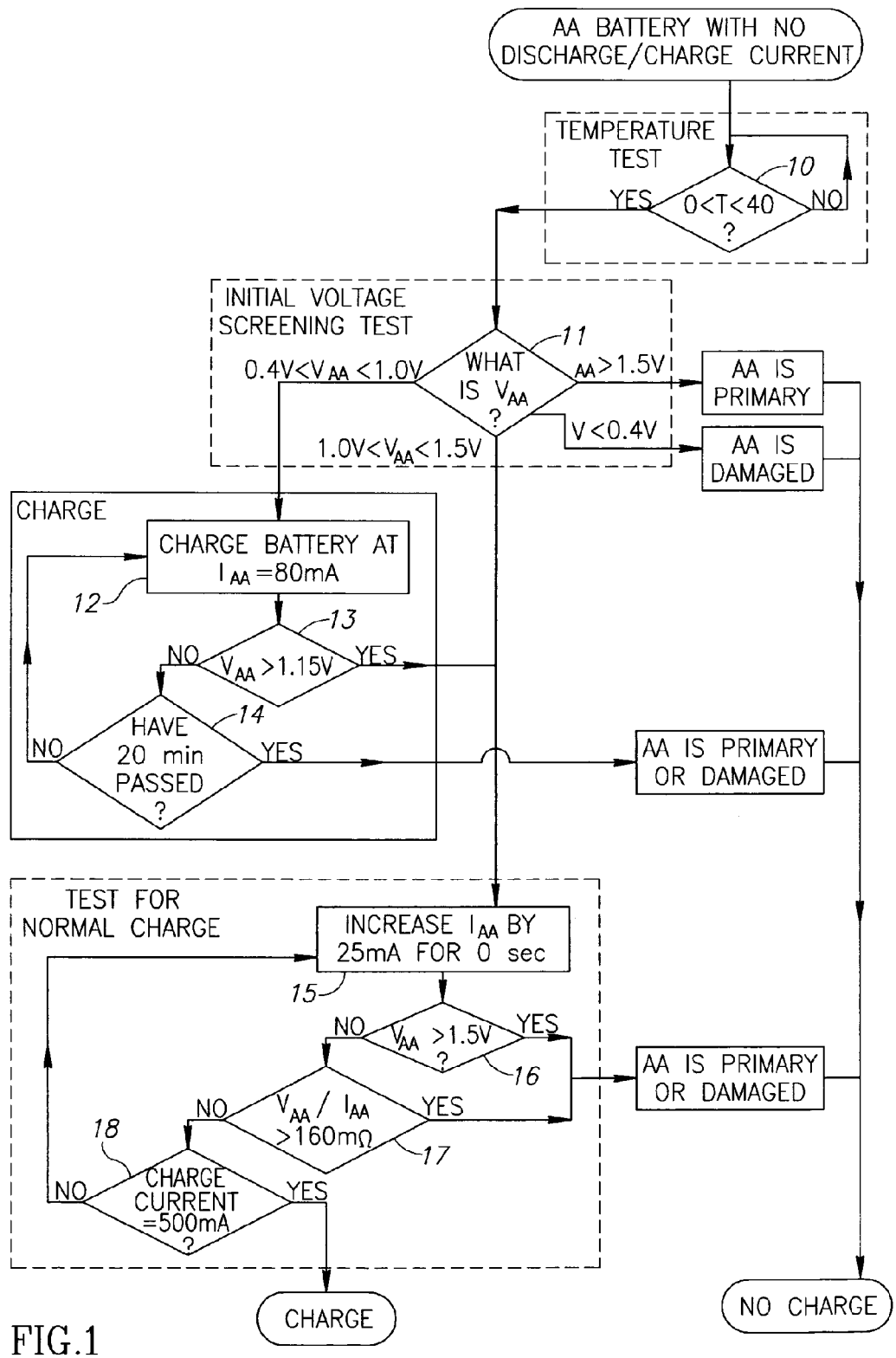
FIG. 1 is a flow chart illustrating a first preferred method by which the power management control system of the present invention operates in detecting whether the battery undergoing charge is a rechargeable or a primary type.
Figure 2A:
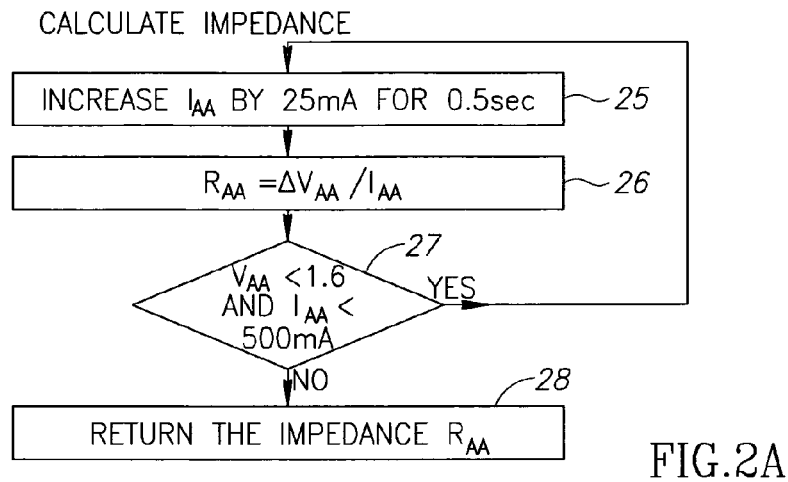
FIGS. 2A-2C are a flow chart illustrating a second preferred method, extending that of FIG. 1, by including the possibility of making a number of impedance measurements of the battery during the process to determine battery chemistry more effectively.
Figure 2B:
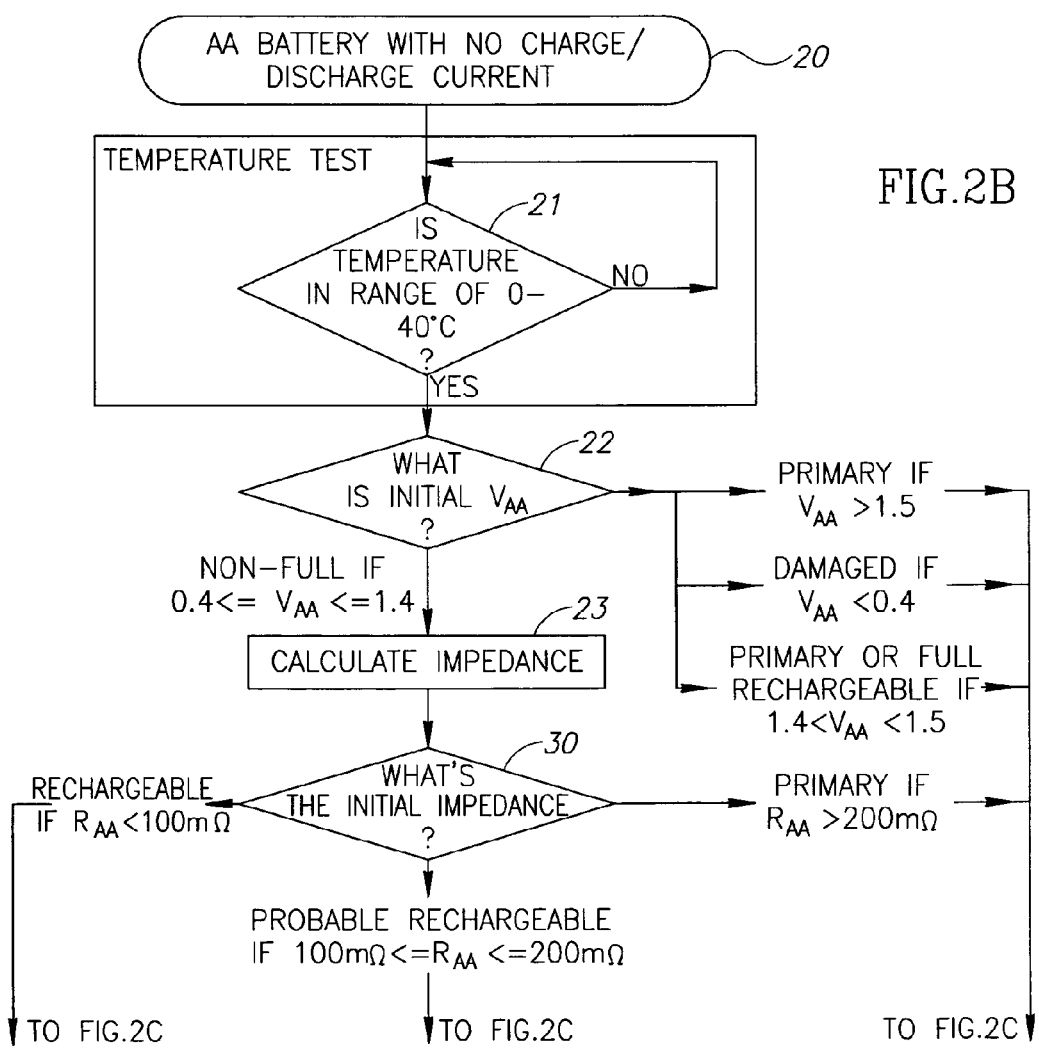
Figure 2C:
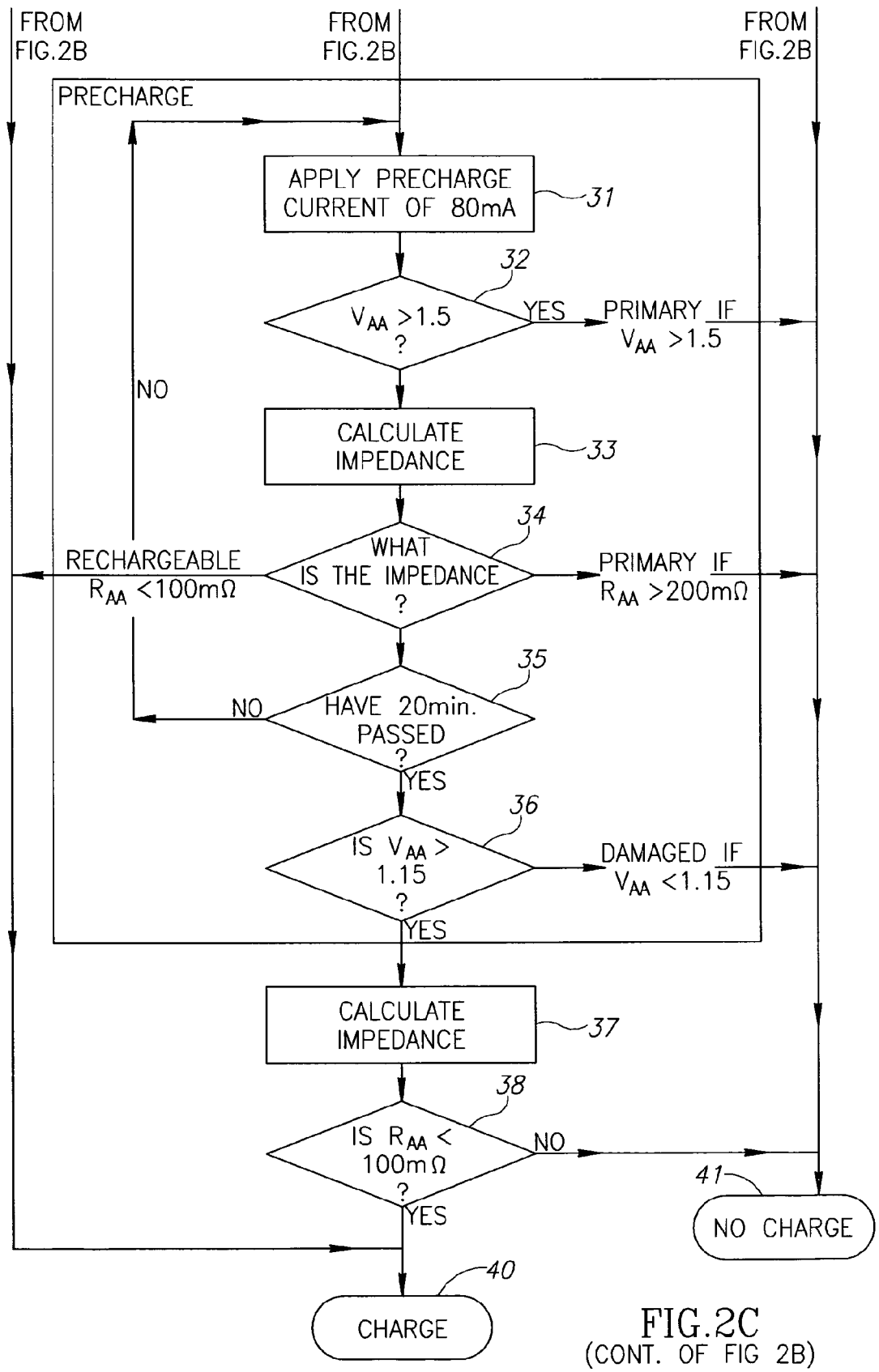

Reference is now made to FIG. 1 and FIGS. 2A-2C, which are flow charts illustrating preferred routines by which the power management charging control system of the present invention operates in determining whether the battery is a primary battery, in which case the charger is prevented from flowing charge current to it, or a secondary cell, in which case it can be recharged. These algorithms are called the battery chemistry algorithms, or battery detection algorithms, and operate in general by measuring the terminal voltage and temperature under certain predetermined charging tests. The algorithm shown in FIG. 1 is a simpler preferred example, and that in FIGS. 2A-2C is an extension to that of FIG. 1, in which there are more possibilities of repeated iterative steps.

In order to make the flow chart procedures, and in particular, the values thereon, more familiar for common use, all measurement values are given as referred to procedures for use with a single AA-sized cell, having a capacity of 2.5 Ah. It is to be understood, however, that this is not meant to be a limitation of the methods of the present invention, but that they can be equally well applied for use with any type or size of batteries, by the use of appropriate voltage and current values for the numerical examples given.

The following abbreviations are used in FIG. 1 and FIGS. 2A-2C:

$V_{AA}$=AA battery voltage
$I_{AA}$=AA battery charge or discharge current.
$R_{AA}$=AA battery impedance.

Referring now to the first preferred embodiment, as shown in the flow chart of FIG. 1, in step 10, a temperature test is performed on the battery without any charge or discharge current. If the temperature of the AA battery is detected as being outside of a recommended range, typically 0° C. to 40° C. for civilian applications, then charging is disabled and no tests are performed, until the temperature enters the recommended range. This is determined by periodic checking of the temperature.

In step 11, an initial voltage screening test is performed on the AA battery, again without any charge/discharge current. This effectively checks the battery's open-circuit voltage:

1. If $V_{AA}$>1.5 V, then the AA battery is definitely primary, and charging is disabled.

2. If 1.0 V<$V_{AA}$<1.4 V, then the AA battery may be primary or rechargeable, so the Test for Normal Charge in step 20 below is performed.

3. If 0.4 V<$V_{AA}$<1.0 V, then the AA battery is presumed to be either a primary or secondary cell deeply depleted, or a damaged primary or secondary cell, and so the Pre-Charge procedure of steps 14 to 18 below is performed in order to attempt to differentiate between these possibilities.

4. If $V_{AA}$<0.4 V, then it is assumed that the cell can be regarded as damaged, and so charging is disabled.

The pre-charging procedure is designed to distinguish between damaged cells which showed some sign of being chargeable, and healthy cells, whether primary such as alkaline, or secondary such as NiMH. The procedure for pre-charging the AA battery is performed as follows:

1. In step 12, the AA battery is charged at a current low compared to the recommended charging current of the AA size of cells used in this example, typically a current of $I_{AA}$=80 mA, i.e. about 0.03 C, and $V_{AA}$ is monitored:

2. If $V_{AA}$>1.15 V, as shown in step 13, then it is concluded that the AA battery has passed pre-charge, and the Test for Normal Charge in step 15 is performed. It should be noted that both primary and secondary cells in good condition will pass this step 13, but the primary cells will be eliminated later in step 16 of the Normal Charge procedure. If $V_{AA}$<1.15 V, then the pre-charge process is continued until $V_{AA}$>1.15 V 3. If $V_{AA}$ has not risen above 1.15 V within 20 minutes, as shown in step 14, then it is concluded that the battery is damaged, pre-charge is stopped and charging is disabled.

The Test for Normal Charge is performed as follows:

1. In step 15, the AA battery is charged at a charge current that increases preferably over a period of 10 seconds from 0 to 500 mA, i.e. 0.2 C, in steps of 25 mA (0.5 seconds for each step). After each 25 mA increase, the following checked are performed:

2. In step 16, if $V_{AA}$>1.5 V, then the AA battery is presumed to be damaged or a primary battery, and so charging is disabled.

3. In step 16, if $V_{AA}$<1.5 V, the impedance of the battery is checked in step 17, by inspecting the increase in $V_{AA}$ from its no-charge-current value ($\Delta V_{AA}$). The impedance=$\Delta V_{AA}/I_{AA}$, where $I_{AA}$ is the charge current at the time of the measurement. Alternatively and preferably, the impedance can be given by the incremental increase in voltage per step, divided by the incremental increase in current per voltage step. If this calculated impedance is greater than 200 mΩ, then it is concluded that the AA battery is damaged or is a primary battery, and so charging is disabled.

4. If the AA battery goes through the entire 0 to 500 mA charge current ramp without any of the previous two measurements indicating it to be a primary, then it is concluded in step 18 that the AA battery is rechargeable and so charging is enabled.

During normal charging, the AA battery is charged preferably at a constant 1.4 A. In addition to the preliminary battery detection algorithm shown in FIG. 1, additional tests are performed during battery charging to confirm the detection process and to ensure the safety of the charging process.

1. $V_{AA}$: If it is above 1.6 V, then it is concluded that the battery is primary, and so charging is stopped.

2. Temperature: If it is above 60° C., then charging is stopped for safety reasons.

3. If the battery has not reached end-of-charge within 150 minutes, then charging is stopped, for safety reasons.

The following is a summary of the safety precautions taken according to the methods of the present invention, to make sure that only a suitable rechargeable battery is charged:
1. Charging and testing is disabled at inappropriate temperatures.
2. Before charging, a special test is done:
   (i) The battery's open-circuit voltage is checked
   (ii) The battery is charged at an increasing ramp of current, while its absolute voltage is monitored, as well as its internal impedance, to make sure that its characteristics fit those of a rechargeable, and not a primary battery.
3. During pre-charge:
   (i) The battery's voltage is monitored so that when it rises, pre-charge is stopped and the AA battery is put through the battery detection test.
   (ii) A 20-minute time limit is used
4. During charging:
   (i) The battery's voltage is monitored to make sure that its characteristics fit those of a rechargeable, not a primary, battery.
   (ii) The battery's temperature is monitored to avoid charging at inappropriate temperatures.
   (iii) A 150-minute time limit is used.

The algorithm illustrated in FIG. 1 uses predetermined cell charging procedures in order to determine the impedance of the cell. However, it is to be understood that this can be just as readily performed using cell discharge in an algorithm similar to that of FIG. 1, replacing charging steps by discharging steps in the "Test for Normal Charge" routine of the procedure. For the discharge algorithm, the criteria for some of the steps may need to be amended to suit the discharge voltage/current characteristics being sought. In step 16, the criterion becomes that if $V_{AA}$ has fallen below 0.8V, it is concluded that the battery is damaged, the discharge is stopped, and charging disabled.

According to further preferred embodiments of the present invention, it is possible to use a composite algorithm for cell chemistry detection, in which both charging and discharging routines are used.

Reference is now made to FIGS. 2A-2C, which illustrate another method of determining battery chemistry, according to a further preferred embodiment of the present invention. In the preferred method shown in FIG. 1, it is noted that the decision that the battery can be charged is taken as an outcome of the final Test for Normal Charge stage, in steps 20 to 26. This is consistent with a general tenet that the impedance of the battery is a good test of its nature, secondary batteries generally having a lower impedance than primary batteries. The Test for Normal Charge is essentially a stepped impedance test, and therefore, is a suitable final criterion in the method of FIG. 1 for battery chemistry determination, along with the battery output voltage measurement, as performed at a number of points during the course of the method of FIG. 1.

However, if the internal battery impedance is a good indicator of battery chemistry, it may be advantageous to measure the impedance at other stages during the process, and to utilize the results earlier. In particular, the impedance test can preferably also be performed before the pre-charge stage, or even a number of times therebefore, or even during the course of the pre-charge stage itself, or a combination of both. Alternatively and preferably, the impedance measurement and its stepped charge build up can, according to another preferred embodiment, be performed more than once, since it is known that multiple stepped charging processes often improve the battery charge characteristics. According to this embodiment, it may then be preferable for the outcome of the first of the stepped impedance measurements to be purposely disregarded, and only the second, or an average of some or all of the following impedance tests be used in determining the effective battery impedance for the purposes of this method.

Therefore, according to further preferred embodiments of the present invention, a measurement routine is used for determining the battery impedance, whether in charge or discharge, and this routine is used optionally at a number of points during the battery chemistry determination process. The simplest routine is to simply apply a current, typically a fraction of the recommended charging current, to the battery for a short time, typically of about 0.5 seconds, and to determine the impedance from the change in battery voltage as a result of the application of the current. Another, but more complex preferred embodiment of this process is shown in the flow charts of FIGS. 2A-2C.

It is to be understood that the particular stages and measurements shown in the preferred embodiment of FIGS. 2A-2C are not meant to limit the invention to that particular order and number of impedance measurements, but that FIGS. 2A-2C is only one exemplary procedure for using a combination of at least one of the battery output voltage measurement, and the battery internal impedance measurement or measurements, in order to determine a safe procedure for charging such batteries in general and to determine the battery chemistry in particular.

Reference is now made first to FIGS. 2B-2C, which constitute the body of a flow chart, including impedance measurements shown in the FIG. 2A routine, according to a preferred embodiment of the present invention. As for the simpler procedure of FIG. 1, in step 21, a temperature test is performed on the battery the battery under test before charging, without any charge or discharge current, 20. If the temperature of the AA battery is detected as being outside of a recommended range, typically 0° C. to 40° C. for civilian applications, then charging is disabled and no tests are performed, until the temperature enters the recommended range. This is determined by periodic checking of the temperature.

If the temperature is within the desired range, then in step 22, an initial voltage screening test is performed on the battery, again without any charge/discharge current. This effectively checks the battery's open-circuit voltage. Slightly different preferred criteria are illustrated in the procedure of FIGS. 2A-2C, compared with those used in the embodiment of FIG. 1, though the underlying principles are similar, as follows:
1. If $V_{AA} > 1.5$ V, then the AA battery is considered to be primary, and charging is disabled.
2. If $V_{AA} < 0.4$ V, then it is assumed that the cell can be regarded as damaged, and so charging is disabled.
3. If $1.4 V < V_{AA} < 1.5$ V, then the AA battery is considered to be either primary, or a fully charged secondary battery, and charging is disabled.
4. If $0.4 V < V_{AA} < 1.4$ V, then the AA battery is considered to be primary or rechargeable, and in step 23, its internal impedance is measured, preferably by the preferred procedure shown in FIG. 2A.

Reference is now made back to FIG. 2A, which shows a preferred routine for determining the internal impedance $R_{AA}$ of the battery under test. This routine is similar to that shown in steps 15-18 of FIG. 1 of the present invention, under the heading "Test for Normal Charge".
1. In step 25, the AA battery is charged at a charge current that increases, preferably in steps of 25 mA every 0.5 seconds, over a total period of 10 seconds from 0 to 500 mA, i.e. 0.2 C. After each 25 mA increase, the impedance of the battery is checked in step 26.

2. In step 26, the impedance of the battery is checked by inspecting the increase in $V_{AA}$ from its no-charge-current value ($\Delta V_{AA}$). The impedance $R_{AA}=\Delta V_{AA}/I_{AA}$, where $I_{AA}$ is the charge current at the time of the measurement. Alternatively and preferably, the impedance can be given by the incremental increase in voltage per step, divided by the incremental increase in current per voltage step. The value of the impedance measured is preferably stored in the system memory for use later in the procedure, where decisions based on the level of the impedance need to be made. Such decisions may preferably be made on the basis of a single impedance measurement, or on an average of impedance measurements, or on the basis of selected impedance measurements, or any other combination as determined by the particular criteria chosen by the system designer.

3. In step 27, the procedure checks whether the battery voltage has reached a preferred level of 1.6 V, or whether the charge current has covered the entire preferred charge current ramp-up to 500 mA. If neither of these conditions are fulfilled, control returns to step 25, and the current is increased by another 25 mA step. If either of these conditions are fulfilled, the impedance measurement routine is complete, and control returns in step 28 to the main process in FIG. 2B to step 30.

Back in FIG. 2B, in step 30, the initial impedance measured in the routine of FIG. 2A is calculated. As previously mentioned, this impedance can be defined by any single measurement, but it may be more preferably defined by the result obtained at the end of one complete ramp charge process, up to its termination. An alternative definition of the impedance for use in step 30 may preferably be the average obtained after a number of charging ramps, or the impedance obtained by one or more charging ramps, but with the first charging ramp omitted (as the first ramp may produce results not typical of the true impedance, and only after the conditioning effect of that first ramp-up, may the battery show its true behavior), or any other combination of impedance measurements which the system designer chooses. The important aspect of step 30 is that the impedance measurement chosen is considered to be an initial measure of the likelihood of the battery being a good rechargeable battery or of a primary battery. Thus, according to the preferred set of levels used in this exemplary embodiment, if the impedance is less than 100 mΩ, the battery is assumed to be rechargeable and charging is enabled in step 40 of FIG. 2C. On the other hand, if the impedance is more than 200 mΩ, the battery is assumed to be either damaged or primary, and charging is disenabled in step 41 of FIG. 2C. If the impedance is between 100 and 200 mΩ, it is likely, though not certain, that the battery is rechargeable, and control is thus passed to the Precharge Procedure, as shown in FIG. 2C, beginning with step 31.

Reference is now made to FIG. 2C, which continues the algorithm from FIG. 2B. In step 31, the precharge procedure is begun, which has similarities to the example of the precharge procedure described in the embodiment of FIG. 1. As with that procedure, the pre-charging procedure is designed to distinguish between damaged cells which showed some sign of being chargeable, and healthy cells, whether primary such as alkaline, or secondary such as NiMH. The precharge procedure for an AA battery is performed as follows:

1. In step 31, the battery is charged at a current low compared to the recommended charging current of the AA size of cells used in this example. A current of $I_{AA}=80$ mA, i.e. about 0.03 C, is preferably used, and $V_{AA}$ is monitored.

2. At step 32, if $V_{AA}>1.5$ V, it is assumed that the battery is a primary battery, charging of which is disabled in step 41. It is possible that this battery may not have been detected earlier in step 22 because of its low initial charge level.

3. In step 33, the internal impedance of the cell is checked, preferably according to the routine described in FIG. 2A, and the result of the impedance measurement, according to whatever criteria is used for defining the impedance, is checked in step 34.

3. In step 34, the same decisions are preferably made, as those used in the initial impedance check of step 30. This, if the impedance is less than 100 mΩ, the battery is assumed to be rechargeable and charging is enabled in step 40. On the other hand, if the impedance is more than 200 mΩ, the battery is assumed to be either damaged or primary, and charging is disenabled in step 41. If the impedance is between 100 and 200 mΩ, it is likely, though not certain, that the battery is rechargeable, and the precharge test is continued with step 35.

4. In step 35, the precharge time is checked, and if the predetermined 20 minute time for the precharge has not been reached, control is returned to step 31 to continue with the precharge procedure, preferably after a short time interval to avoid continuous impedance tests from being made. It is sufficient to test for impedance at predetermined intervals.

5. In step 36, at the end of the preferred 20 minute predetermined precharge period, the battery terminal voltage is measured, and if $V_{AA}<1.15$ V, it is concluded that the battery is damaged, pre-charge is stopped and charging is disabled at step 41. On the other hand, if $V_{AA}>1.15$ V, it is concluded that the AA battery has passed the pre-charge test, and control is passed to step 37.

By the end of the precharge process, it is possible that both primary and secondary cells in good condition will have reached this step without the good condition primary cell being flagged as unsuitable for charging. Therefore, one more step is required in order to ensure that any battery passed beyond the precharge test is fit for recharging before the main charge circuits are enabled. This last step is provided by another impedance test, performed in step 37. As previously, this impedance test can be either a ramped routine, or a selected number or combination of ramped routines, or even a single test, all as described in the embodiment of FIG. 2A.

In step 38, the value of the selected impedance measure is checked, and if $R_{AA}<100$ mΩ, it is assumed that the battery is rechargeable, and charging is performed in step 40. On the other hand, if $R_{AA}>100$ mΩ, it is assumed that the battery is in fact primary, and charging is disenabled in step 41.

One aspect in which the procedure described in the embodiment of FIGS. 2A-2C differs from that of FIG. 1, is that impedance measurements according to this embodiment, can be performed both before, and during the precharge process. This may be advantageous in that if it is determined by means of one of these earlier impedance routines, that the battery is a good condition secondary battery, then the instruction in step 40 to charge the battery in the normal manner can be provided accordingly earlier than according to the procedure of FIG. 1. Statistically, this will not only shorten the precharge stage, which is a significant user advantage, since full charging of the battery can commence sooner, but in addition, it decreases the probability that primary batteries will run through the whole time and energy wasteful precharge cycle before they are detected as such. This embodiment is particularly advantageous for distinguishing, for instance, between an alkaline cell and a fully depleted NiMH cell, both of which may begin the pre-charge process with impedances of similar levels. However, unless the NiMH cell is damaged, it should revive soon after commencement of the pre-charge stage, such that the execution of impedance tests during the pre-charge stage will generally enable its detection as a secondary cell much more quickly than if the pre-charge was performed without intermediate impedance tests. Likewise, it will soon become apparent during the course of the pre-charge stage that the impedance of the alkaline battery is tending towards that of a primary cell, thus also eliminating the need to continue the pre-charge to its completion.

All of the additional tests, the safety precautions and the possibility of using discharge currents where appropriate instead of charging currents, as described hereinabove in relation to the first preferred embodiment of FIG. 1, are also understood to apply, where relevant, to this preferred embodiment of FIGS. 2A-2C.

It is to be emphasized that the aim of all of the methods according to the various preferred embodiments of the present invention, is to determine the battery chemistry of a battery under charge, and to instruct the disenablement of the charging function if it is determined that the battery chemistry is primary, or if it is determined that the battery is damaged and cannot be charged successfully or perhaps even safely. It is thus to be emphasized that the various procedures of the present invention are not foolproof methods of checking batteries to ensure that no battery which is potentially useful is not rejected as damaged or unsuitable for charging. According to their properties or characteristics, it is feasible that, using the methods of the present invention, some potentially good batteries will be rejected as unsuitable for charging. However, it is believed that the main aim of the invention, to prevent charging of primary or unsuitable batteries, should be executed with a high degree of success.

Furthermore, the methods described above have generally been described in terms of application to a battery, this term being understood to include a cell or a battery of cells. When used for a multi-cell battery, or for a number of cells inserted into a device by the user to constitute the "battery" of the device, the values of the parameters of the algorithm can be adjusted to take into account the different voltages and impedances expected from the multi-cell battery, and the method is thus useful for determining the battery chemistry of the complete multi-cell battery. In a battery comprising a small number of cells, it may also be possible to perform the invention with the intention of determining the chemistry of any individual cell of the battery, in particular, to prevent charging if any of the cells of the battery are unsuitable for charging. In such a case, the test will generally be less sensitive because of the need to use averaged criteria to detect the effect of a single cell in a series arrangement of several cells of a different type.

Figure 3:
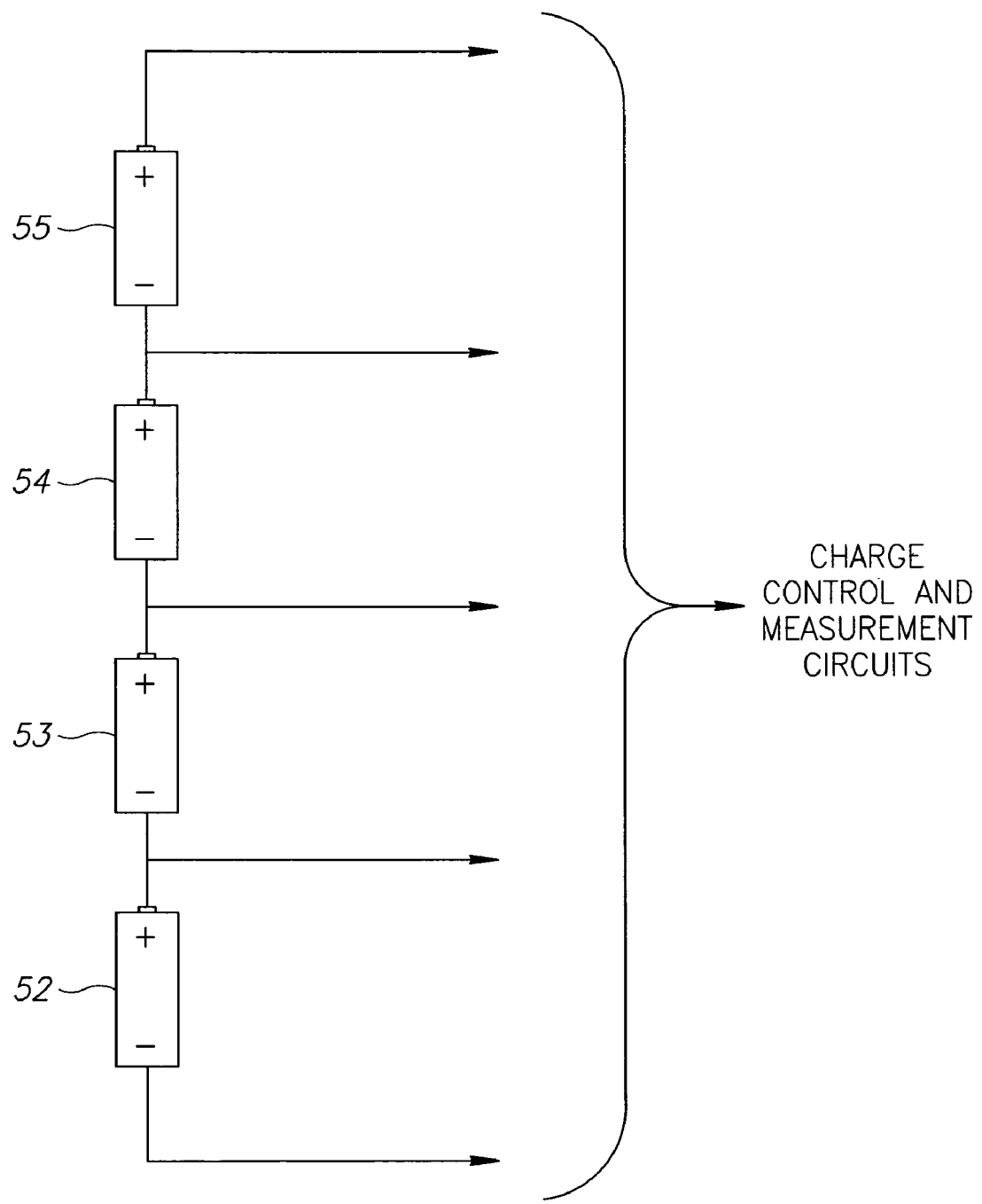
FIG. 3 illustrates schematically the internal connections of a battery wired for use with a cell balancing algorithm of the present invention.

Reference is now made to FIG. 3, which illustrates schematically the internal connections of a battery of an electronic device, wired to execute the cell balance algorithm, according to a further preferred embodiment of the present invention. When the battery is made up of more than one cell, it is of importance to ensure that none of the cells are depleted substantially more than the others before commencing to charge the cells. Such a situation of imbalance can occur, for instance, if the user has previously removed one of the cells for use in another device, and then has returned it to the battery in a state of almost complete depletion. Such a depleted or almost depleted cell should not be charged together with cells having a much higher state of charge, as this would involve running the charging current through fully charged cells, while the cell with lower level of charge is still being charged. This would result in overcharging of full cells, which is generally damaging to those cells, shortening their lives, as well as being wasteful. The cell balance algorithm operates by measuring the terminal voltage of each cell separately, in order to determine the state of charge of each cell. Alternatively, the discharge characteristic of each cell is determined by measuring the voltage behavior under discharge. Since it is more convenient electronically to refer all measurements to one end of the battery, the voltage of each cell is preferably determined by successively measuring the voltages from one end of the stack of cells, increasing the number of cells in the stack at each measurement, and subtracting successive results to obtain the voltage of the last cell added to the stack measured. Once all the cells, whether one or more, which are partially or fully depleted have been detected, the entire stack of cells from the depleted or partially depleted cell furthest from one end of the battery to that end of the battery is discharged, such that all of those cells are now in a discharged state. The stack of now equally discharged cells can now be recharged, without causing overcharging to any of the cells in the complete battery.

The battery shown in the preferred example illustrated in FIG. 3 contains four cells, 52, 53, 54 and 55. Each of the cells of the battery has leads output from both of its terminals to the charge control and measurement circuits in order to execute the cell balance algorithm. These output leads are used both for measuring the terminal voltage on individual cells, and for making connection for discharging or charging current from the stack at any one of the cells in the battery. In this preferred embodiment, cell 52 is called the "bottom" cell of the battery, and cell 55 the "top" cell of the battery, though it is to be understood that this nomenclature is used purely for reasons of convenience in explaining the operation of the algorithm, and has no significance regarding the physical orientation of the battery pack.

In order to illustrate the execution of the cell balancing algorithm, an example is used in which, during the precharge tests, or by direct voltage measurement, cell 54 is found to have a substantially lower charge than that of the other three cells in the battery. In order to charge the depleted cell 54, it is important that the charging current is not passed through any of the other fully charged cells, 52, 53 and 55, to avoid overcharging them. Using the bottom end of the battery as the common connection point of the battery, the algorithm arranges that all of the cells situated below that of the depleted cell, i.e. cells 52 and 52, are first fully discharged. Once this has been done, all of cells 52, 52 and 54 are then at a similar state of discharge. In such a situation, it is now possible to perform a charge cycle of all of the cells from a similar state of depletion, without causing overcharging of any of the cells. This is performed by charging cells 52 to 54 together to a state of full charge.

Although the embodiment shown in FIG. 3 discharges the cells from the depleted cell down towards the negative terminal of the so-called bottom cell 52, it is to be understood that the algorithm could be equally well applied by discharging all of the cells from the depleted cell up towards the positive terminal of the so called top cell 95. In such a case, only cell 54 would be discharged, and the recharging would then need to be only of cells 54 and 55.

Alternatively and preferably, the algorithm could be arranged to select the end of the battery closer to the depleted cell in order to discharge and recharge the required cells, though this would involve appropriate connection of the battery to the control circuitry of the battery charge management system. According to a further preferred embodiment, the cell balancing procedure could be arranged to operate only on the individual cells which are found to be partially or fully depleted, without needing to discharge and charge any other cells in the stack. Such an embodiment would involve more complex circuitry to enable connection to be made for control of current into and out of cells not located at one end of the battery.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A method of determining the nature of an electro-chemical battery, comprising the steps of:
   (a) measuring the initial voltage of said battery;
   (b) according to said initial voltage, determining the initial impedance of said battery by generating a current flow through said battery, and measuring the voltage change of said battery as a result of said current flow;
   (c) according to said initial impedance, performing the steps of:
      (i) applying a pre-charge current, and measuring the voltage of said battery at intervals during said application of pre-charge current; and
      (ii) according to the voltage of said battery during said application of pre-charge current, making at least one internal impedance determination of said battery by generating at least one increased current flow through said battery, and measuring the voltage change of said battery as a result of said at least one increased current flow; and
   (d) utilizing at least one of said initial measured voltage, said measured voltage of said battery during said application of pre-charge current, said initial impedance, and said internal impedance to determine the nature of said electro-chemical battery.

2. A method according to claim 1 and wherein if said initial voltage is above a first predetermined voltage said battery is considered to be a primary battery, and if said initial voltage is below a second predetermined voltage, said battery is considered to be unusable.

3. A method according to claim 1 and wherein if said initial impedance is above a first predetermined impedance, said battery is considered to be a primary battery, and if said initial impedance is below a second predetermined impedance, said battery is considered to be a secondary battery.

4. A method according to claim 3, wherein said pre-charge current is applied if said initial impedance falls between said first predetermined impedance and said second predetermined impedance.

5. A method according to claim 2 and wherein if said voltage measured during said pre-charge application rises above said first predetermined voltage, said battery is considered to be a primary battery.

6. A method according to claim 2 and wherein if, at the end of said predetermined time, said voltage measured during said pre-charge application has not risen above a third predetermined voltage between said second and first predetermined voltages, said battery is considered to be unusable.

7. A method according to claim 1 and wherein said internal impedance is measured at intervals during said pre-charge application, and if at least one of said internal impedance determinations is found to be above a first predetermined impedance, said battery is considered to be a primary battery, and if at least one of said internal impedance determinations is found to be below a second predetermined impedance, said battery is considered to be a secondary battery.

8. A method according to claim 1 and wherein said internal impedance is measured after said application of pre-charge current, and if said internal impedance is found to be above said second predetermined impedance, charging of said battery is prevented, and if said internal impedance is found to be below said second predetermined impedance, said battery is considered to be a secondary battery.

9. A method according to claim 1, and wherein said at least one internal impedance determination comprises any one of a single point impedance measurement, an averaged impedance measurement over one application of at least one increased current flow, the final impedance measurement after one application of at least one increased current flow, and a combination of impedance measurements from a plurality of increased current flows.

10. A method according to claim 1 and wherein said at least one increased current flow is generated by at least one of applying a charge current to said battery and discharging a current from said battery.

11. A method according to claim 1 and wherein said at least one increased current flow through said battery is an incrementally increasing current flow.

12. A method according to claim 11 and wherein said incrementally increasing current flow is continued until either one of a predetermined battery voltage and a predetermined charge current is reached.

13. A method according to claim 1 and wherein said pre-charge current is a predetermined fraction of the recommended charge current of said battery.

14. A method according to claim 1 and wherein if said battery is determined to be any one of a primary battery, an unusable battery, or a full rechargeable battery, charging of said battery is prevented, and if said battery is determined to be a secondary battery, charging of said battery is enabled.

15. A method of determining the nature of an electro-chemical battery, comprising the steps of:
   (a) measuring the initial voltage of said battery;
   (b) according to said initial voltage, performing one of the steps of:
      (i) applying a pre-charge current of a predetermined fraction of the recommended charge current of said battery for a predetermined time, and measuring the voltage of said battery during said predetermined time; and
      (ii) generating an incrementally increasing current flow in said battery, and measuring the voltage of said battery during said application of said incrementally increasing current flow; and
   (c) utilizing at least one of said measured voltages to determine the nature of said electro-chemical battery.

16. A method according to claim 15 and wherein if said initial voltage is above a first predetermined voltage said battery is considered to be a primary battery, and if said initial voltage is below a second predetermined voltage, said battery is considered to be unusable.

17. A method according to claim 16, wherein said pre-charge current step is applied if said initial voltage falls between said first predetermined voltage and a third predetermined voltage less than said second predetermined voltage, and wherein if, during said precharge step, said voltage does not rise above a fourth predetermined value, said battery is considered to be unusable.

18. A method according to claim 16, wherein said incrementally increasing current flow is applied if said initial voltage falls between said third predetermined voltage and said second predetermined voltage.

19. A method according to claim 18 and wherein if said voltage measured during said incrementally increasing current flow rises above a fifth predetermined voltage, greater than said first predetermined voltage, said battery is considered to be unusable.

20. A method according to claim 18 and wherein said voltage measured during said incrementally increasing current flow is utilized to determine the internal impedance of said battery, and if said internal impedance is greater than a predetermined level, said battery is considered to be unusable.

21. A method according to claim 18 and wherein if said internal impedance is less than said predetermined level, said battery is considered to be a secondary battery fit for charging.

22. A method according to claim 15 and wherein said at least one incrementally increasing current flow is generated by at least one of applying an incrementally increasing charge current to said battery, and discharging an incrementally increasing charge current from said battery.

23. A method of ensuring cell charge balance in a rechargeable battery comprising a plurality of cells; comprising the steps of:
 determining the state of charge of each cell of said battery;
 locating at least one deficient cell, the deficiency of said cell being in that its state of charge is significantly less than that of at least one other cell;
 discharging all of the cells located from said at least one deficient cell towards one end of said battery; and
 recharging said at least one deficient cell together with all of said cells located from said at least one deficient cell towards said one end of said battery.

* * * * *